United States Patent [19]

Slater et al.

[11] 4,169,666
[45] Oct. 2, 1979

[54] FOREGROUND STABILIZATION SYSTEM FOR USE IN COMPOSITE PHOTOGRAPHY

[75] Inventors: Dan Slater, La Habra; John C. Gale, Hollywood; Joseph L. Matza, Malibu, all of Calif.

[73] Assignee: Magicam, Inc., Hollywood, Calif.

[21] Appl. No.: 871,757

[22] Filed: Jan. 23, 1978

[51] Int. Cl.² ............................................. G03B 21/32
[52] U.S. Cl. ......................................... 352/85; 352/46; 352/53; 352/133
[58] Field of Search .................. 352/46, 53, 85, 48, 352/133

[56] References Cited

U.S. PATENT DOCUMENTS

| | | | |
|---|---|---|---|
| 3,902,798 | 9/1975 | Trumbull et al. | 352/85 |
| 3,914,540 | 10/1975 | Slater | 352/53 |

*Primary Examiner*—Monroe H. Hayes
*Attorney, Agent, or Firm*—Jaskson, Jones & Price

[57] ABSTRACT

In a composite photography system of the type wherein a foreground camera photographs life-size actors and objects while a background camera photographs scenery on a life-size scale or a scale different from life-size so that when the outputs from both cameras are combined the actor or foreground objects will appear to be located in the scenery filmed by the background camera, it is crucial that the motion of the background camera be slaved to the motion of the foreground camera. The foreground camera is mounted on a yaw and pitch support mechanism which is in turn mounted on a boom that provides movement along the z axis. The boom is carried by a dolly that moves the entire assembly in the x-y plane. Sensors on the dolly detect movement along the five axes of x, y, z, yaw and pitch, and cause the background camera to move its corresponding amount. These sensors, however, do not detect dolly rotation about its vertical, or z, axis which is perpendicular to the stage floor, or x-y plane, on which the dolly moves. Even a slight rotation of the dolly as it moves on the stage floor causes a misalignment of the foreground and background scenes. An inertial sensor, located on the dolly, is utilized to sense this rotation.

19 Claims, 6 Drawing Figures

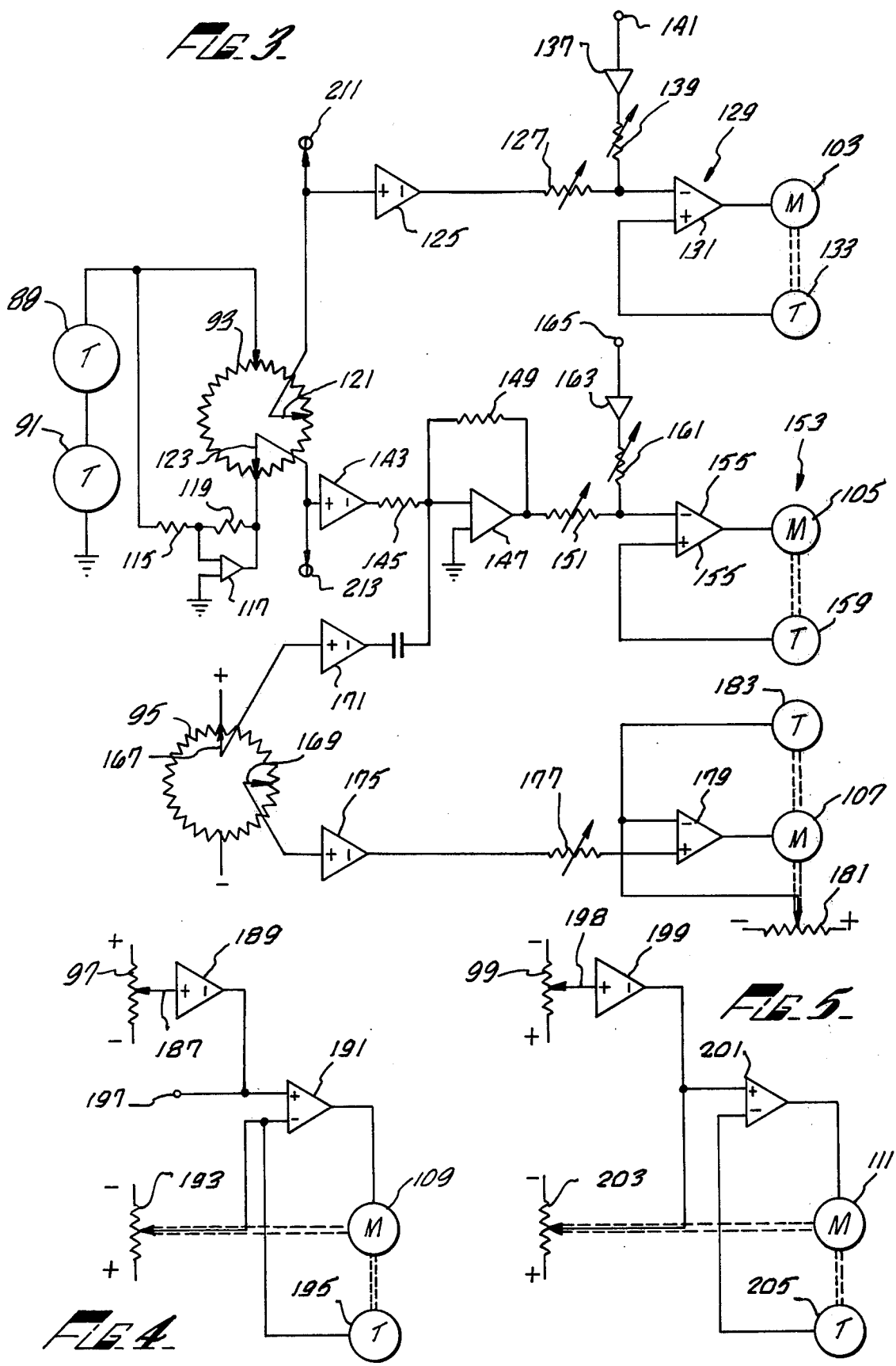

FOREGROUND STABILIZATION SYSTEM FOR USE IN COMPOSITE PHOTOGRAPHY

BACKGROUND OF THE INVENTION

The present invention relates in general to improvements in composite photography systems of the type in which different scenes are photographed by separate cameras and these scenes are combined to form the finished picture. More particularly, the present invention pertains to new and improved motion synchronizing means between two or more cameras wherein the movement of the perspective viewpoint of one camera in relation to the scene it is seeing is sensed and related to the perspective viewpoint of another camera in relation to the scene it is seeing.

The combining of scenes viewed by separate cameras is generally accomplished by a process in which the portions of the background scene photographed by the background camera corresponding to the foreground objects are blanked out or masked in the foreground scene photographed by the foreground camera. In the film technique currently in use, the masking is accomplished by making an opaque matte of the foreground objects and printing the background scene masked by that matte. The foreground objects are then printed on the masked areas of the background to form the composite picture. The cameras may be either film or television cameras. The foreground scene typically includes moving objects such as actors. Because the masking matte moves or travels from frame to frame, such a system has come to be referred to in the art as a traveling matte system.

A major problem in such a system is to maintain registration of the perspective viewpoints of the background and foreground cameras within acceptable accuracy during relative movement of the foreground and background cameras in relation to the objects constituting their frame of reference, including the scene which each views. Unless this registration is maintained, the desired illusion is lost. The required degree of accuracy depends upon the intended use of the finished composite picture. Wide screen motion picture projection, for example, requires much more accurate registration than commercial television.

Up to very recently, composite image systems, such as traveling matte systems, have not provided the capability of synchronized movement of the cameras relative to their respective frames of reference, including their viewed scenes. The system described in two U.S. patents, one issued to Dan Slater, Oct. 21, 1975, for an Optical Node Correcting Circuit, U.S. Pat. No. 3,914,540, and another one issued to Douglas H. Trumbull, et al., for Composite Photography System on Sept. 2, 1975, U.S. Pat. No. 3,902,798, describe a system which has the capability of synchronizing the background camera movements with the foreground camera movements in the x, y, z, yaw and pitch axes so that a cameraman can "dolly," "crab" or "pedestal" as ordered by the director in the foreground to achieve the desired artistic effect while the background camera tracks the movement of the foreground camera in these five axes. For a complete description of such a system, reference should be made to these two patents. They are incorporated herein as if fully set forth at this point.

As explained in these patents, the objects viewed by the perspective of the two cameras usually differ in scale or relative size. The scene viewed by the background camera typically could be a miniaturized set while the scene viewed by the foreground camera typically would be a life-size actor or object. Combining a life-size actor with a miniature background set, according to the traveling matte technique, will cause the full-size actors to appear to be in a lifelike environment of the miniaturized set. Because the scene viewed by the background camera is miniaturized, the movements of the background camera are appropriately scaled to the size of the miniature set. This is fully explained in the above two patents. It should be borne in mind that this technique, however, is not limited to a situation where life-size actors are placed into a miniature set. It also finds application in the remote control of cameras generally such as where, for example, the environment of one or both of the cameras controlled is adverse by being dangerous, relatively inaccessible or the like.

Typically, the foreground camera is mounted on a four-wheel dolly which is steered by an operator while the cameraman rides thereon and shoots the scene being filmed. The dolly is driven and steered by means of all four wheels, wherein all four wheels pointed in the same direction at one time to provide a constant heading. It is, therefore, capable of moving along the ground plane or stage floor in a limitless variety of travel paths. The position and perspective in which the foreground camera views its scene is duplicated with great accuracy and effectiveness in the background camera along the x, y, z, yaw and pitch axes, as fully explained in the two above-identified patents.

However, prior art systems that utilize a dolly-mounted foreground camera have failed to recognize, and compensate or correct for inherent rotational movement of the dolly about its vertical axis which is generally perpendicular to the x-y axis, ground plane or stage floor.

It has been found that the following factors affect dolly rotation about its vertical axis during a dolly move:
 1. stretch or shock in the dolly steering mechanism;
 2. unevenness of the stage floor (x-y plane) on which the dolly moves; and
 3. dolly tire slippage.

None of these factors can be controlled to the point of reducing dolly rotation to an acceptable level without restricting dolly maneuverability, as would be the case, for example, if the dolly was mounted for movement along a physical track. The failure to recognize and correct for the problem has resulted in unrealistic movement of the foreground objects in the background scene when the two scenes are combined.

OBJECTS AND SUMMARY OF THE INVENTION

It is an object of this invention to provide a system wherein the foreground and background camera in a composite photography system are completely aligned in along the x, y, z, yaw and pitch axes.

It is another object of this invention to correct misalignment between the foreground and background camera in a composite photography system caused by rotation of the foreground camera dolly on the floor on which it moves.

It is a further object of this invention to provide a rotation error generating circuit that receives the output of an inertial sensor mounted on the foreground camera dolly and generates signals to be supplied to the background camera servo-control circuits to compensate for dolly rotation.

These objects and the general purpose of this invention are accomplished as follows. An inertial sensor is mounted on the dolly carrying the foreground camera. The inertial sensor provides a signal representative of the degree of rotation of the dolly about its vertical axis which is approximately perpendicular to the ground plane over which the dolly moves. A rotation error signal generating circuit receives the output signal from the inertial sensor which is indicative of dolly rotation and generates an error-correcting signal for the x axis, y axis and yaw axis. The rotation error signal generating circuit corrects for any drift error of the inertial sensor when the dolly is at rest.

BRIEF DESCRIPTION OF THE DRAWINGS

Other objects and many of the intended advantages, as well as the exact nature of this invention will be readily apparent from consideration of the following specification in conjunction with the accompanying drawings in which like reference numerals designate like parts throughout the figures thereof and wherein:

FIG. 3 is a block and schematic diagram illustrating the apparatus for coupling the movement of the foreground and background cameras along the x, y and z axes.

FIG. 4 is a block diagram and schematic diagram illustrating apparatus for coupling the foreground and background cameras in yaw.

FIG. 5 is a block diagram and schematic diagram illustrating apparatus for coupling the foreground and background cameras in pitch.

DESCRIPTION OF THE PREFERRED EMBODIMENTS

Figure 1:
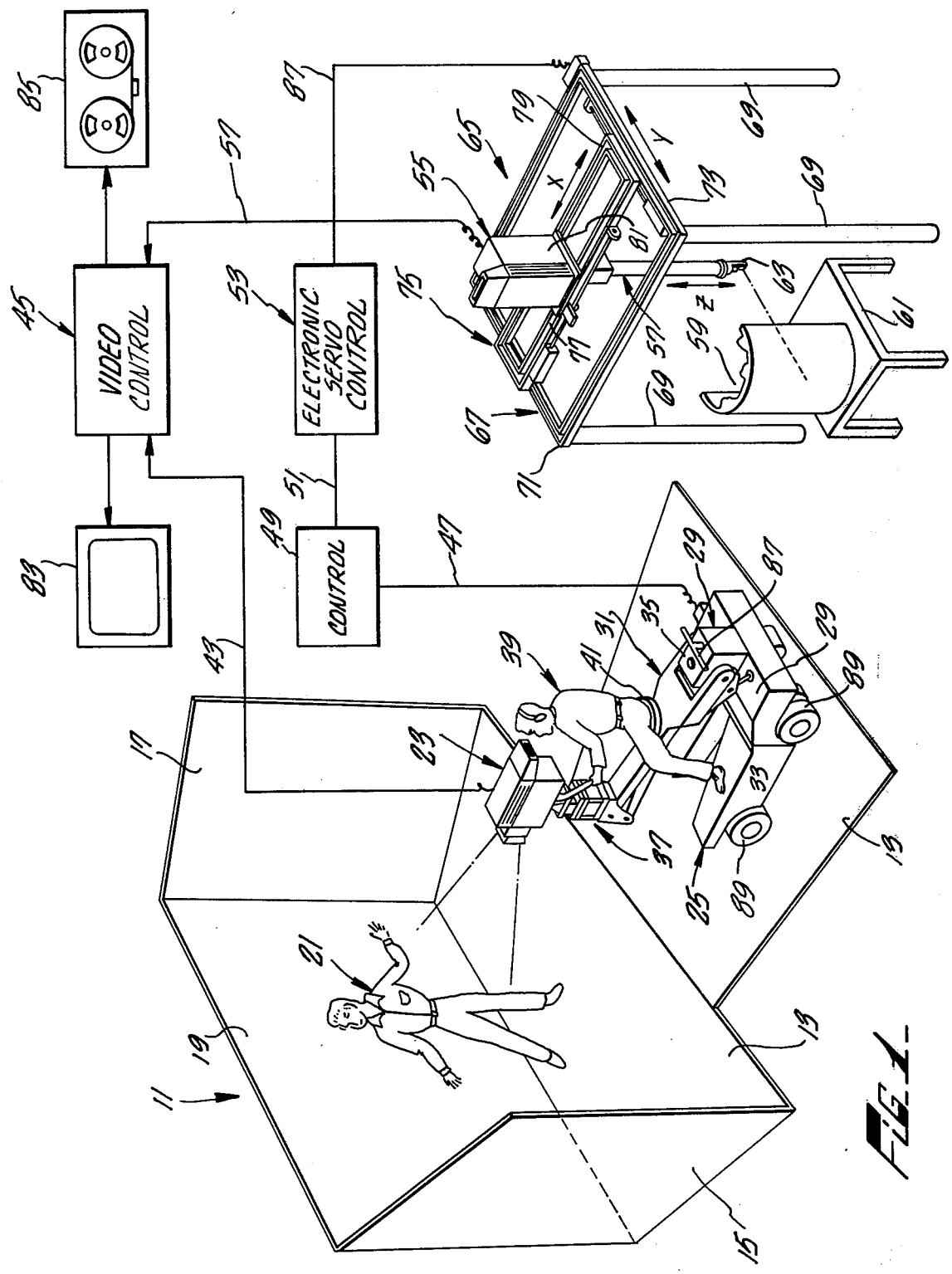
FIG. 1 is a perspective view partly diagrammatic of a composite photography system in which the present invention may be used.

A composite photography system with which the present invention can be utilized is diagrammatically shown in FIG. 1. There is indicated generally at 11 a stage including a floor or ground plane 13, sidewalls 15, 17 and a rear wall 19. The upper surface of the stage floor 13 and the interior surfaces of the walls 15, 17 and 19 are colored or otherwise treated to perform the keying function. When a blue matte system is used, the surfaces just mentioned are colored blue. An actor 21 stands on the stage floor within the field of view of a foreground camera indicated generally at 23.

The camera is illustrated as being a television camera. However, it could just as well be a movie camera. Camera 23 is mounted on a dolly indicated generally at 25. The dolly has a platform 27 with a stanchion 29 projecting upwardly from it. A boom indicated generally at 31 is bifurcated in its rear portion providing a pair of legs 33, 35 which are journaled to stanchion 29 for pivotal rotation about a horizontal axis (not shown) which is parallel to the ground plane or stage floor 13.

The dolly 25 has means provided thereon for pivotally moving the boom 31 between uppermost and lowermost positions, including a pentograph device for maintaining the axis of camera support pedestal 37 vertical during such movement. A cameraman indicated generally at 39 sits on a seat 41 mounted on the upper portion of boom 45 substantially midway of its length.

The video output of camera 23 is fed through a cable 43 to a video control box 45. Signals carrying intelligence as to the movement of camera 23 horizontally, vertically and in yaw and pitch are fed through a cable 47 to control unit 49 and from the control unit 49 through cable 51 to electronic servo-control circuits 53.

A background camera 55, having a downwardly extending periscope lens 57, views a miniature scene indicated generally at 59, which is placed on a table 61. The periscope lens 57 has a mirror or prism 63 mounted at its lower end. A support stand 65 for the camera 55 and its periscope lens 57 includes a fixed rectangular frame 67 supported at its corners by four vertical legs 69. The frame 67 includes a pair of parallel disposed side legs 71 and 73. A rectangular dolly frame 75 is mounted for linear movement on legs 71 and 73 of the fixed frame 67. For purposes of reference, the direction of movement of the rectangular dolly frame 75 on legs 71, 73 will be indicated as the Y direction.

The dolly frame 75 itself has a pair of spaced parallel legs 77 and 79 on which is mounted a carrier 81 for transverse movement along these legs in the X direction. The carrier 81 supports the background camera 55.

The video output of background camera 55 is fed over cable 57 to the video control circuits 45. The output of video control circuit 45 may be either supplied to a monitor 59 or to a tape recorder 61, or both. The video control circuits 45 combine the video signals from the foreground camera 23 and the background camera 55 according to the moving matte technique, for example.

Signals from the electronic servo-control circuits 53 which are derived as a result of the movement of foreground camera 23 are supplied by way of cable 87 to the support stand 65, and its respective motors mounted thereon in order to control movement of camera 55 along the x, y, z, yaw and pitch axes, as explained more fully in the Trumbull, et al. U.S. Pat. No. 3,902,798.

For a complete description of the foreground camera dolly 25 and the mounting and control of the foreground camera 23, reference should be had to the Trumbull, et al. U.S. Pat. No. 3,902,798, the entire disclosure of which is incorporated herein by reference. The following description of the operation of the foreground camera dolly 25 will be related only to explaining how the signals for movement along the x, y, z, yaw and pitch axes are generated in the foreground:

A T-bar steering mechanism 87 is provided on dolly 25 for simultaneously rotating each of the four wheel assemblies 89 of the dolly 25 about their vertical mounting axis so that all four wheel assemblies are at all times parallel to one another and pointing in the same direction to provide a constant heading. A first tachometer generator 88 and a second tachometer generator 91 (FIG. 3) are mounted on support brackets in the proximity of the drive motor for one of the wheel assemblies. These tachometer generators are connected by a belt device to their respective wheels.

During a steering action with planar movement, the pair of wheels in a wheel assembly 89 will rotate. However, one wheel will rotate clockwise and the other will rotate counterclockwise an equal amount, thereby causing their respective tachometer generators to generate equal and opposite signals. As a result, no output signal for dolly movement is produced. However, when both wheels are turning in the same direction or unequally, the tachometer generators 88, 91 generate a signal proportional to the rate of travel or rotation of the wheels in the ground plane.

A potentiometer mounted to the vertical shaft of the steering T-bar 87 is utilized in a manner which will be hereinafter more fully explained to resolve the output of tachometers 88 and 91 into the X and Y vectoral components of the movement of the dolly 25 on the plane of the stage floor 13.

The boom has a potentiometer 95 (FIG. 3) mounted at its horizontal axis of rotation. The arm of the potentiometer is attached to the boom 31. The potentiometer generates voltage signals indicative of the angular movement of boom 31 primarily in the Z axis and partially in the Y axis. The potentiometer 95, as will be more fully explained hereinafter, resolves the arcuate movement of the camera as the boom is raised and lowered into its Y and Z components.

Camera 23 is mounted on a support pedestal 37. Pedestal 37 permits the camera to be moved along the yaw and pitch axes. The camera operator 39, by means of handle 40, attached to pedestal 37, can move camera 23 in its horizontal and vertical plane. Rotation of camera 23 around an axis in the horizontal plane is called pitch. Rotation of camera 23 around an axis in the vertical plane is called yaw. The pedestal 37 has potentiometer sensors mounted thereto for sensing yaw and pitch. Whenever the camera operator 39 rotates camera 23 about its vertical axis causing it to move in its horizontal plane, a potentiometer 97 (FIG. 4), attached to a vertical shaft of the support pedestal 37, registers the degree of movement in yaw. A potentiometer 99 (FIG. 5), attached to a horizontal shaft of the pedestal 37, registers the degree of movement in pitch.

These signals are operated on by the control circuits 49 and electronic servo-control circuits 53 and provided to motors mounted on the support stand 65 for the background camera 55. As will be explained hereinafter, the electronic servo-control circuits 53 provide X direction drive signals to a motor 103 (FIG. 3) to drive the carrier 81 back and forth along legs 77 and 79 of the dolly frame. Likewise, the servo-control circuits 53 supply Y control signals to a motor 105 which drives dolly frame 75 back and forth along the legs 71 and 73 of the fixed frame 75. Likewise, the servo-control circuits 53 supply Z control signals to a motor 107, which causes the periscope lens 57 to move up and down. Electronic servo-control circuits 53 also provide a yaw signal to a motor 109 which causes the periscope lens 57 to rotate about its vertical axis. Electronic servo-control circuit 53 also supplies a pitch control signal to a motor 111 which is attached to move the mirror or prism 63, mounted at the end of the periscope lens 57, about its horizontal mounting axis. If greater detail of the structure and motor connections utilized to accomplish these synchronized movements is desired, reference should be had to the aforementioned Trumbull, et al. patent.

Figure 2:
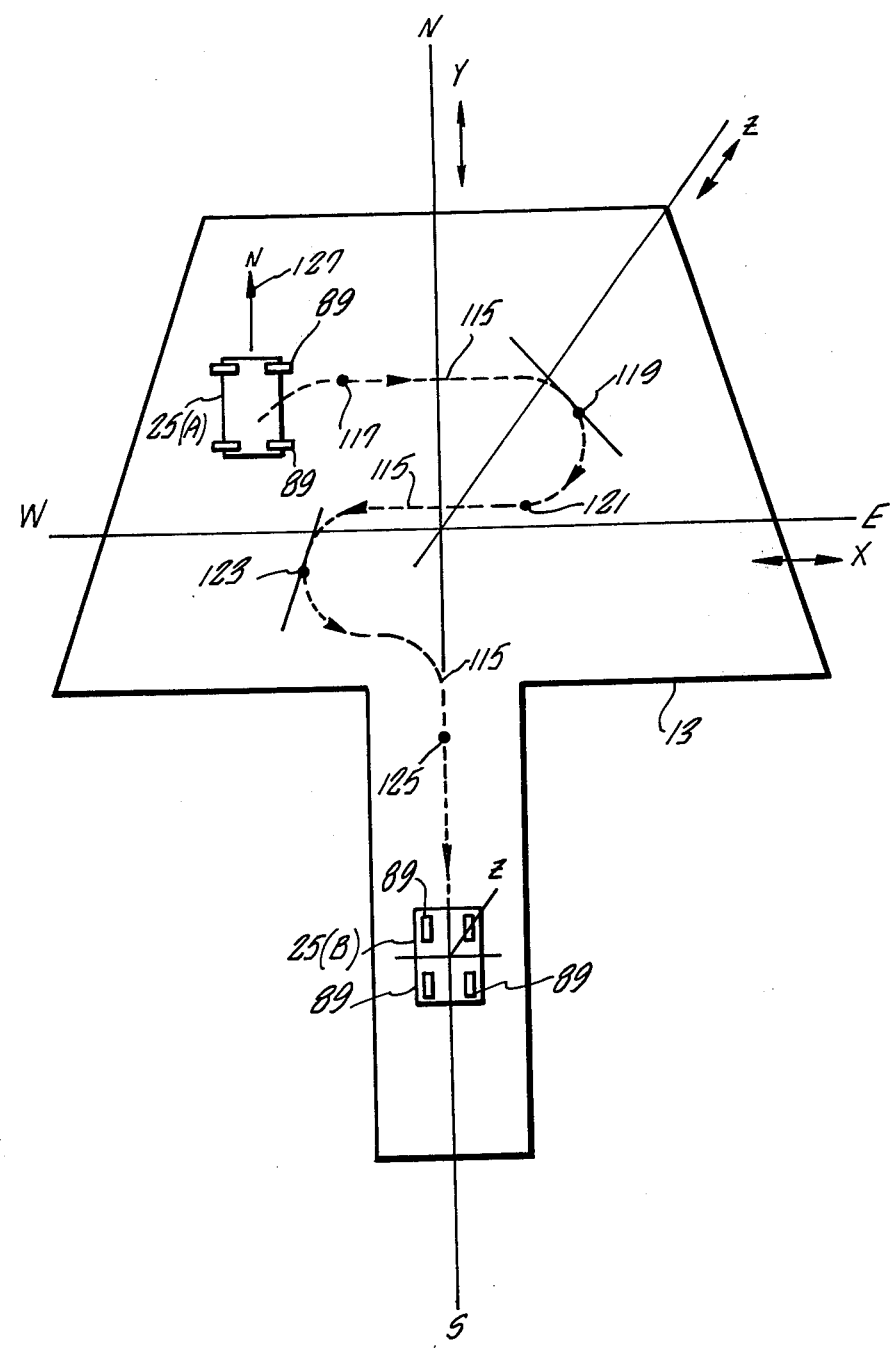
FIG. 2 is a diagrammatic illustration of the ground plane or stage floor in which the foreground camera dolly moves.

Referring now to FIG. 2, which schematically illustrates the top view of stage 13 with the foreground camera dolly 25 thereon, a theoretical explanation as to how the movement of the foreground camera 25 is related to the movement of the background camera 55 (FIG. 1) will be provided. Assuming the dolly 25 is in its start position, 25(A), and is in a "crab" mode (all four wheel assemblies are being rotated simultaneously to provide a constant instantaneous heading), the dolly orientation with respect to the stage floor 13 remains fairly constant. The longitudinal axis of the dolly 25 is arbitrarily defined as the "north" direction 127. The dotted line 115 illustrates a selected path of travel that the dolly may take from its start position 25A to its ending position 25B.

As a result of the two tachometer generators 88, 91 (FIG. 3), mounted on the wheel assemblies 89 of the dolly, the velocity at which the dolly is moving is continuously sensed from the start to the end of the move. As a result of the potentiometer 93, attached to the vertical shaft of the T-bar steering mechanism 87 (FIG. 1), the direction of dolly movement is also continuously sensed from the start to the end of the move. Thus, for our example, at the starting point before the dolly 25 begins to move, it has a zero velocity and a direction relative to the defined north 127 of 45°. At point 117 of the travel path, as a result of movement by the dolly, assuming the dolly is moving at 20 inches per second, it will be registering this velocity at an angle of 90° to reference north 127. At point 119 on the travel path, assuming the dolly is moving at 25 inches per second, the indication from the sensors will be this velocity at an angle of 135° to reference north 127. At point 121, the dolly may be moving at 20 inches per second, but at an angle of 270° to reference north 127. At point 123, the dolly may be moving at 10 inches per second, but at an angle of 310° to reference north 127. At point 125, the dolly may be moving at 20 inches per second, but at an angle of 360° to reference north 127. These velocities and angles of movement are examples of some of the instantaneous velocities and directions that the dolly encounters during the shooting of one scene. The dolly operator continuously varies both velocity and direction of travel as he causes the dolly to move.

It can be seen that if the speed and direction of movement of the foreground camera dolly is reproduced at each point along path 115, the foreground camera dolly move is reproduced. However, the background camera apparatus (FIG. 1) is designed to cause the background camera 55 to move in linear amounts along five axes, x, y, z, yaw and pitch. Since the movement of the foreground camera dolly on the stage floor 13 involves curved paths of travel, the velocity and angle of travel along each point of the path 115 taken by the dolly must be converted to cartesian coordinates.

This can be accomplished by converting the velocity and direction of travel (polar coordinates) at each point on the path of travel 115 of the dolly 25 on ground plane stage 13 to two velocity vectors. The two velocity vectors are a north/south velocity vectors which coincide with the reference north direction 127 and an east/west velocity vector which is perpendicular to the reference north 127. By deriving these two velocities at each point along the path of travel 115 and supplying them to the background camera support and moving mechanism 65, the foreground dolly movement in the plane of the stage floor 13 is reproduced by the background camera.

If the background scene 59 viewed by the background camera 55 is a miniature set, the movement of the viewpoint of the background camera 55 must be related to the scale factor of the background set. Accordingly, the signals generated as a result of the movement of the viewpoint of the foreground camera, that is, the x, y, z, yaw and pitch signals used to drive the background camera servos must be scaled down by the appropriate scale factor. If a more complete and thorough description of all the elements and components of the apparatus required to perform these functions is desired, reference should be had to the above-noted Trumbull, et al. and Slater patents.

Because the tachometer generators attached to the wheels 89 of the dolly 25 indicate movement only when the wheels are turning, slight rotation of the dolly about its vertical axis, which is perpendicular to the ground plane or stage floor 13, would not be detected by the above-described system. Therefore, the background camera would not receive x or y axis signals that compensate for the slight rotational movement of the dolly.

As a result of rotation in a previous movement, the ensuing dolly movement would start at a point of reference which is different from the point of reference of the background camera. Even if the foreground and background cameras are in registration at the start of a move, rotation of the foreground camera during the move creates misalignment. Such misalignment is manifested in the composite picture, for example, by the foreground character, or actor 21, sliding across the floor of the background scene.

The present invention provides the cameraman and dolly operator with the greatest degree of mobility possible, and thereby aids in the creation of an artistic and aesthetically pleasing product, while sensing dolly rotation relative to the foreground stage and correcting for that rotation. Because this rotation is about a vertical, or z axis, the x axis, y axis and yaw axis are affected. These three signals, therefore, must be corrected.

It has been found that using an inertial sensor to sense dolly rotation has definite advantages over outside reference methods. Several different types of inertial sensors could be utilized. For example, an angular accelerometer could be used which would require double integration to determine the degree of rotation. It was found, however, that a simple, inexpensive single-degree-of-freedom rate gyroscope provided an angular velocity signal that was sufficiently accurate when augmented by electronic processing. A rate gyroscope used in an actual embodiment was made by Northrup Manufacturing Company. The gyroscope is mounted on the dolly platform 25 so that its input axis is parallel to the vertical or z axis of the dolly.

The servo-control circuitry and control signal generation circuitry identified as boxes 53 and 49 on FIG. 1, respectively, are shown in FIGS. 3, 4 and 5. Tachometer generators 88, 91, which are mounted at a pair of wheels 80 of the dolly, as previously explained, are connected in series so that if the wheels are turned in equal and opposite directions, their combined output will be zero. Tachometer 88 is connected to one side of potentiometer 93 and through a resistor 115 to an inverting amplifier 117. The output of amplifier 117 is connected to the opposite side of potentiometer 93, and to its input through a feedback resistor 119. When dolly movement occurs, the net output signal from tachometer generators 88, 91 is impressed across the sine/cosine potentiometer 93 which, it will be recalled, is responsive to the deviation of the wheel assemblies on the dolly from the north reference position as directed by the dolly operator manipulating his T-bar steering mechanism 87 (FIG. 1). As this T-bar steering mechanism is turned, the sine wiper 121 and the cosine wiper 123 are moved accordingly.

The output signal from the sine wiper 121 is fed through a buffer amplifier 125 and scaling resistor 127 to the x drive assembly 129 on the background camera support. The x drive assembly 129 receives this x drive signal at one input of operational amplifier 131 and feeds it to x drive motor 103. The output shaft of motor 103, besides driving the background camera support plate 81 in the x direction, is also connected to a tachometer generator 133. The output of tachometer generator 133 is, in turn, fed back to the input of amplifier 131. This type of servo-loop is commonly known as a velocity servo.

An additional x axis correction signal is supplied to the input of amplifier 131 through a buffer amplifier 137 and a scaling resistor 139. The x axis correction signal supplied to the buffer amplifier 137 at its input 141 is generated by the rotation error correction circuit of FIG. 6, as will be more fully explained hereinafter.

The cosine wiper 123 of the potentiometer 93 produces an output signal which is supplied over buffer amplifier 143 and resistor 145 to operational amplifier 147 which has a feedback resistor 149. The output of operational amplifier 147 is supplied through scaling resistor 151 to the y drive assembly 153. This signal is received by operational amplifier 155, which feeds it to a y drive motor 105. The shaft of the motor, besides driving the moveable frame 75 (FIG. 1) is connected to tachometer generator 159, which has its output connected to an input of operational amplifier 155. This, again, is a velocity servo.

An additional y axis error correction signal is supplied to operational amplifier 155 through buffer amplifier 163 and scaling resistor 161. The signal supplied to the input 165 of buffer amplifier 163 is generated by the error correction circuit of FIG. 6, as will be more fully explained hereinafter.

Angular movement of the boom 31 (FIG. 1) is measured by a sine and cosine potentiometer 95, which has a cosine wiper 167 and a sine wiper 169. Because angular movement of the boom 31 about its horizontal axis produces changes in the foreground camera location in both the y and z directions, the output of cosine wiper 167 is combined with the output of the y wiper 123 of potentiometer 93 to thereby produce the control signal supplied to the y drive circuit 153. The cosine wiper 167 of potentiometer 95 produces a signal whenever the boom is moved up and down. This signal is fed through buffer amplifier 171 to capacitor 173. The signal is differentiated and summed with the y correction signal from the cosine wiper 123 of potentiometer 93.

The output of sine wiper 169 of boom potentiometer 95 is fed through a buffer amplifier and scaling resistor 177 to the input of an operation amplifier 179 which drives z parameter motor 107. Motor 107 causes movement of the background camera in the vertical or z direction by causing the periscope lens 57 (FIG. 1) to move up and down. The shaft of motor 107 is also connected to a potentiometer 181 which provides a position feedback signal to the input of operational amplifier 179. The shaft of motor 107 is further connected to a tachometer generator 183 which provides a velocity feedback signal to the input of amplifier 179. This servo is commonly known as a rate damped position servo.

Means are provided for scaling the control signals supplied to the x, y and z servo units. Such scaling means includes the scaling resistors 127, 151 and 177, which are ganged together, as indicated, to scale the movements of the background camera in relation to the size of the background set. Additional compensation factors compensate for signal loss in the leads and provide a controller offset voltage. The controller offset voltage compensates for the difference in height between the foreground ground plane and the background ground plane, since the background set may be located at table height.

FIG. 4 illustrates a preferred control and servo-circuit for coupling the foreground and background cameras for movement along the yaw axis. The foreground camera yaw potentiometer 97 includes a wiper 187 which feeds its output through a buffer amplifier 189 to operational amplifier 191. The output of operational amplifier 191 drives the yaw motor 109 on the background camera, which causes the periscope 57 (FIG. 1) to rotate about its vertical axis. Motor 109 drives the wiper of resistor 193, which provides a position feedback signal to operational amplifier 191. In addition, the shaft of yaw motor 109 is connected to a tachometer generator 195, which provides a velocity feedback signal to operational amplifier 191.

An additional signal is supplied to terminal 197, which is summed with the yaw signal supplied to operational amplifier 191 from the yaw potentiometer 97. This signal is the yaw axis pointing error signal generated by the rotation error correction circuit of FIG. 6, as will be explained more fully hereinafter.

FIG. 5 illustrates preferred circuitry for coupling the foreground and background camera movements along the pitch axis. The foreground camera pitch potentiometer 99 supplies an output through its wiper 198 to buffer amplifier 199 and to operational amplifier 201, which drives pitch motor 111. The output of motor 111 causes the mirror prism 63, mounted in the end of the background camera periscope, to rotate about its horizontal axis. The shaft of motor 111 is also connected to the wiper of a potentiometer 203, which supplies a position feedback signal to the input of operational amplifier 201. The tilt motor 111 is further connected to a tachometer generator 205, which supplies a velocity feedback signal to operational amplifier 201. This again is known as rate damped position servo circuit.

Figure 6:
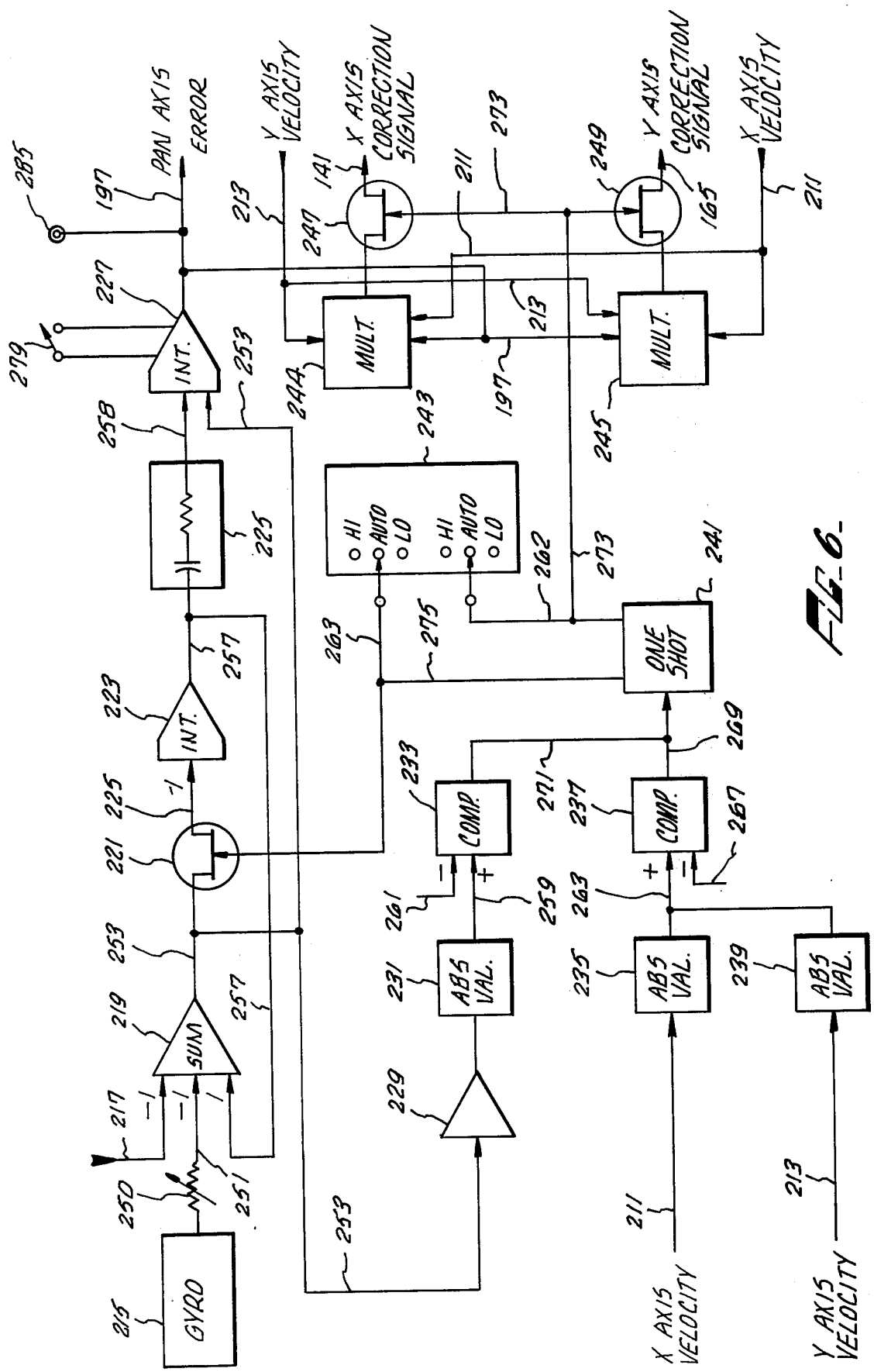
FIG. 6 is a block diagram and schematic diagram of a preferred embodiment of the foreground stabilization circuitry according to the present invention.

Referring now to FIG. 6, there is illustrated the dolly rotation error correction signal generating circuit that generates the x axis, y axis and yaw axis error correction signals that are supplied to the background camera servo circuits of FIGS. 3 and 4. A gyroscope 215, which is mounted on the dolly with its input axis aligned with the vertical axis of the dolly, is illustrated in block form. It should be understood that although a single-degree-of-freedom gyroscope is illustrated, and preferred, other inertial sensors may also be used.

The output of the gyroscope is supplied through a scaling resistor 250 and over line 251 to the input of a summing amplifier 219. A constant offset voltage is supplied over line 217 as another input to summing amplifier 219. The third input to the summing amplifier is a signal on line 257 representative of gyroscope drift which is inherent in the single-degree-of-freedom gyroscope 215.

Although an inexpensive single-degree-of-freedom gyroscope inherently exhibits long-term drift and cumulative errors, it can still be used for sensing dolly rotation because a foreground camera dolly move during a shooting sequence is generally less than five minutes.

Between moves, the foreground camera is at rest and stationary. During this stationary condition, correction can be made for the gyroscope drift. The gyroscope output can be compensated for by sensing the output of amplifier 219 to zero (zero angular velocity). The correction voltage used to do this is an estimate of gyroscope rate bias during a move. During a move, therefore, integrator 223 is switched into a hold mode. The only errors generated by the gyroscope, then, are those that accumulate during the move. These are sufficiently small so as not to create a problem in the composite picture.

When the foreground camera dolly is stationary, the output of the tachometer generators 88, 91 (FIG. 3) is zero and, therefore, the x axis velocity signal and y axis velocity signal on lines 211 and 213, respectively, will be zero. These signals are supplied from the sine and cosine slider arms of the sine/cosine potentiometer 93 (FIG. 3). Absolute value circuit 235 receives the x axis velocity signal. Absolute value circuit 239 receives the y axis velocity signal. The outputs of both circuits 235 and 239 on lines 263 and 265 are supplied to the input of a comparator circuit 237.

Comparator circuit 237 compares the input received by it on line 263 with a voltage reference level supplied to it on line 267. If the input on line 263 is higher than the voltage reference level on line 267, the output of a comparator 237 on line 269 goes high. When the foreground camera dolly is not moving and the x and y axis velocity signals on line 211 and 213 are zero, the output of comparator circuit 237 will be low because the signal on line 263 will be less than the voltage reference signal on line 267.

The output of comparator 237 on line 269 is supplied to a one-shot multivibrator circuit 241. If the signal on line 269 is high, it enables one-shot 241 to generate a high signal on output line 273 and a low signal on output line 275. A high input to one-shot 241 on line 269 will keep the one-shot 241 enabled as long as it it present. If the input signal drops to a low, the one-shot has a one second time out period before its outputs return to their quiescent state. This minimizes the effect of frame and gyroscope resonances.

The x axis and y axis velocity signals on lines 211 and 213 indicate dolly movement in the ground plane of the stage floor. The output signal on line 253 of summing amplifier 219 indicates foreground camera dolly rotation. This signal is supplied to the input of an amplifier 229. The output of amplifier 229 is supplied to absolute value circuit 231, which rectifies its input signal to an absolute value. This absolute value is supplied over line 259 as an input to comparator circuit 233. Comparator circuit 233 generates a high output signal on line 271 if the input signal on line 259 is greater than the amplitude of the voltage reference signal on line 261. The output of comparator circuit 233 on line 271 is OR'd as an input to one-shot multivibrator 241. Thus, a high output either from comparator circuit 237 or comparator circuit 233 can trigger one-shot multivibrator 241 to generate its output signals on lines 273, 275. The circuit of FIG. 6, therefore, responds to x or y axis movement.

Assuming the dolly is at rest, the x and y axis velocity signals on lines 211, 213, respectively, are zero. The dolly will not be rotating about its vertical axis because such rotation is caused by the steering mechanism, tire slippage, unevenness in the floor, etc., factors which come into play only when the dolly is moving. Any output of the gyroscope 215 when the dolly is at rest, therefore, is the result of inherent drift. As will be described hereinafter, this drift is compensated for. However, even if it is not compensated for, the drift signal is not sufficient to trigger comparator 233.

With the foreground dolly at rest, one-shot multivibrator 241 generates a low signal on line 273 and a high signal on line 275. The high signal on line 275 is supplied to transistor switch 221, causing it to turn on. As a result, the signal on line 253, at the output of summing amplifier 219 representing gyroscope drift, is supplied to the input on line 255 of integrator 233. The drift signal is thereby integrated by and fed back to the input of summing amplifier 219 over line 257. This feedback signal causes the output of summing amplifier 219 on line 253 to be driven to zero, thereby correcting for the inherent drift characteristics of gyroscope 215.

The R-C time constant circuit 225 transmits the integrated drift error correction signal to the input of integrator 227 on line 258. The R-C components of the circuit 225 eliminate variations in integrated position in integrator 227 by phase cancelling the gyroscope drift signal during drift update. The R-C network, combined with the integrator 227, act as a unity gain inverter. An equivalent solution to the use of the R-C network is to switch the input to the integrator 227 off during drift update. Either way, the desired result is obtained. The output of integrator 227 is zero when the foreground camera dolly is at rest.

When dolly movement is sensed, either the output of comparator 233 or 237 goes high, causing one-shot multivibrator 241 to generate a high signal on line 273 and a low signal on line 275. This causes transistor switch 221 to turn off. As a result, the output of summing amplifier 219 is no longer supplied to the input of integrator 223. However, the output of integrator 223 holds at the value present at the output on line 257 just prior to switch 221 turning off. R-C circuit 225 acts as an open circuit to this DC value, and the input to integrator 227 on line 258 while the dolly is moving, is zero. This constant value is subtracted from the gyroscope output in summing amplifier 219. The resulting output rate signal of summing amplifier 219 is supplied over line 253 to the input of integrator 227. Integrator 227 thereby generates on line 197 a rotation position signal representing dolly rotation. This signal is supplied over line 197 to the yaw servo-control circuit in the background camera servo system to correct for foreground dolly rotation. The yaw axis even signal rotates the dolly reference frame into the fixed reference frame.

This dolly rotation position signal at the output of integrator 227 is also supplied to the inputs of two multipliers, multiplier 244 and multiplier 245. In order to rotate the dolly referenced velocity data into the system reference frame, multipliers 244 and 245 perform a coordinate transformation according to the following relationship:

$$\overline{X} = X \cos\theta + Y \sin\theta$$

$$\overline{Y} = Y \cos\theta - X \sin\theta$$

where $\theta$ = rotation position signal on line 197 For small angles, the above transform equations can be approximated by:

$$\overline{X} = X + KY\theta$$

$$\overline{Y} = Y - KX\theta$$

where the constant K is selected for a small angle Multipliers 244 and 245 operate according to these approximations.

Multiplier 244 receives the Y axis velocity signal on line 213 and the X axis velocity signal on line 211. It performs the multiplication of $KY\theta$ where $\theta$ is the rotation position signal on line 197 and adds this to the X axis velocity signal received on line 211 to generate the X axis velocity correction signal on line 141.

Multiplier 245 generates the Y axis velocity correction signal on line 165 by multiplying $KX\theta$. The X axis velocity signal X is received on line 211. The rotation position signal $\theta$ is received on line 197. The constant value K is stored in the multiplier circuitry (not shown) in a manner well known in the art. The resultant product is subtracted from the Y axis velocity signal received on line 213.

With the dolly moving, one-shot multivibrator 241 is generating a high signal on line 273 which enables both transistor switches 247 and 249, allowing the outputs of multipliers 244 and 245 to be supplied over lines 141 and 165, respectively, to the servo control circuits of the background camera (FIG. 3). Transistor switches 247 and 249 are utilized to prevent the multipliers' drift from affecting the servo circuits of the background camera during the quiescent state.

Integrator 227 has a switch 279 connected to it so that the integrator 227 may be reset to a zero output by closing switch 279. This circuit additionally has a switch 243 that provides driving signals to the transistor switches 221, 247 and 249. By moving the sliders 260 and 262 of the switch 243 to the high or low position, a high or low voltage signal is provided to the respective switches 221 or 247 and 249, thereby permitting an operator to manually turn the switches on and off for test purposes.

What has been described is a stabilization system for use in a composite photography system which corrects for misalignment of the perspective viewpoints of the foreground and background cameras, due to rotation of the foreground camera dolly around its vertical axis. The system receives a rotation rate signal from an inertial sensor mounted on the foreground camera dolly and generates a rotation error position correction signal which controls the rotation of dolly vector velocities into the system reference frame by correcting the X, Y and yaw axis signals supplied to the servo circuits. It should be understood, of course, that the foregoing disclosure relates only to preferred embodiments of the invention, and that modifications may be made therein without departing from the spirit and scope of the invention as set forth in the appended claims.

What is claimed is:

1. In a composite photography system of the registered matte type having foreground and background cameras, including objects constituting a scene for the foreground camera, the relation between each camera and a scene as received by its respective camera, the perspective of the cameras being coupled for synchronizing the movement of the background camera in relation to its scene with the movement of the foreground camera in relation to its scene along X, Y, Z, yaw and pitch axes, a foreground stabilization system for correcting for rotational movement of the foreground camera dolly, said system comprising:

means for sensing rotational movement of said foreground camera dolly about an axis vertical to the ground plane of the foreground scene, said means generating an output signal indicative of rotation;

means responsive to the output signal from said rotational movement sensing means for generating rotational error correction signals; and means responsive to said rotational error correction signals for correcting for the sensed rotational movement.

2. The foreground stabilization system of claim 1 wherein said rotational movement sensing means comprises an inertial sensor device mounted to said foreground camera dolly for sensing rotation about the axis of rotation of said foreground camera dolly.

3. The foreground stabilization system of claim 2 wherein said inertial sensor comprises a single-degree-of-freedom rate gyroscope.

4. The foreground stabilization system of claim 1 wherein said rotational error correction signal generating means comprises:

means responsive to any movement of said foreground camera for enabling said rotational error correction signal generating means; and means for generating rotational error correction signals for the X, Y and yaw axes.

5. The foreground stabilization system of claim 4 wherein said rotational error correction signals from said generating means are summed with the X, Y and yaw axes drive signals for the background camera.

6. The foreground stabilization system of claim 1 wherein said rotational movement sensing means comprises a single-degree-of-freedom rate gyroscope.

7. The foreground stabilization system of claim 6 wherein said rotational error correction signal generating means comprises means for compensating for short-term drift errors inherent in said rate gyroscope.

8. In a composite photography system of the registered matte type having foreground and background cameras, including objects constituting a scene for the foreground camera and objects at a smaller scale than said foreground objects constituting a scene for the background camera, the foreground camera being supported by mounting means for moving the camera's perspective in dimensions and in yaw and pitch, the background camera being supported by mounting means for moving the perspective of the background camera along X, Y, Z, yaw and pitch axes, sensing means attached to the foreground camera mounting means for generating electrical signals representative of the three-dimensional motion of said foreground camera perspective, as well as motion in yaw and pitch, motor means attached to the background camera mounting means responsive to the electrical signals from said sensing means for moving said background camera perspective along its X, Y, Z, yaw and pitch axes, a foreground stabilization system for correcting for rotational movement of the foreground camera mounting means, comprising:

an inertial sensing means attached to said foreground camera mounting means for sensing rotational movement of said mounting means about an axis vertical to the ground plane of motion of said foreground camera mounting means, said inertial sensing means generating an output signal indicative of rotation of said foreground camera mounting means;

means responsive to the output signal from said inertial sensing means for generating rotational error correction signals; and means responsive to said rotational error correction signal for correcting for the sensed rotational movement.

9. The foreground stabilization system of claim 8 wherein said rotational error correction signal generating means, comprises:

means responsive to the sensing means attached to the foreground mounting means for indicating any movement of said foreground camera;

means for generating rotational error correction signals for the X, Y, yaw and pitch axes in response to the output signal from said inertial sensing means; and means for enabling said rotational error correction signal generating means in response to said movement indicating means indicating movement of said foreground camera.

10. The foreground stabilization system of claim 9 wherein said movement indicating means, comprises:

a first absolute value generating circuit means connected to the sensing means attached to said foreground camera mounting means for providing a signal indicative of movement along a first axis.

11. The foreground stabilization system of claim 10 wherein said movement indicating means further comprises:

a second absolute value generating circuit means connected to the sensing means attached to said foreground camera mounting means for providing a signal indicative of movement along a second axis.

12. The foreground stabilization system of claim 11 wherein said movement indicating means further comprises:

a third absolute value generating circuit means responsive to the output signal of said inertial sensing means for providing a signal indicative of rotational movement of the foreground camera mounting means about an axis vertical to the foreground camera ground plane.

13. The foreground stabilization system of claim 12 wherein said movement indicating means further comprises:

a first comparator means responsive to the combined output from said first and second absolute value generating means for generating an output signal whenever its input exceeds a predetermined reference; and a second comparator means responsive to the output from said third absolute value generating means for generating an output signal whenever its output exceeds a predetermined reference.

14. The foreground stabilization system of claim 8 wherein said rotational error correction signal generating means comprises:

integrating means responsive to the output from said inertial sensing means for generating a first error correction signal;

first multiplier means responsive to the first error correction signal output from said integrating means and a signal from the sensing means attached to the foreground camera for generating a second error correction signal; and second multiplier means responsive to the first error correction signal output from said integrating means and a signal from the sensing means attached to the foreground camera for generating a third error correction signal;

whereby said first error correcting signal is supplied to the motor means attached to said background camera mounting means for correcting the background camera movement along the yaw axis, said second error correcting signal is supplied to the motor means attached to said background camera mounting means for correcting the background camera movement along the X axis, and said third error correcting signal is supplied to the motor means attached to said background camera mounting means for correcting the background camera movement along the Y axis.

15. The foreground stabilization system of claim 14 wherein said rotational error correction signal generating means further comprises means for compensating for the inherent signal drift of said inertial sensing means.

16. The foreground stabilization system of claim 8 wherein said rotational error correction signal generating means comprises:
   means responsive to the sensing means attached to the foreground mounting means for indicating any movement of said foreground camera mounting means;
   means for generating rotational error correction signals for the X, Y and yaw axis in response to the output signal from said inertial sensing means; and
   means for enabling said X and Y axis rotational error correction signal generating means in response to said movement indicating means indicating movement of said foreground camera mounting means.

17. The foreground stabilization system of claim 15 wherein said movement indicating means comprises:
   a first absolute value generating circuit means connected to the sensing means attached to said foreground camera for providing a signal indicative of movement in a first parameter of the foreground camera ground plane;
   a second absolute value generating circuit means connected to the sensing means attached to said foreground camera for providing a signal indicative of movement in a second parameter of the foreground camera ground plane; and
   a third absolute value generating circuit means responsive to the output signal of said inertial sensing means for providing a signal indicative of rotational movement of the foreground camera about an axis vertical to the foreground camera ground plane.

18. The foreground stabilization system of claim 17 wherein said movement indicating means further comprises:
   a first comparator means responsive to the combined output from said first and second absolute value generating means for generating an output signal whenever its input exceeds a predetermined reference; and
   a second comparator means responsive to the output from said third absolute value generating means for generating an output signal whenever its output exceeds a predetermined reference.

19. The foreground stabilization system of claim 18 wherein said means for enabling said error correction signal generating means comprises:
   first switch means connected to the output of said first multiplier means for opening or closing the output path thereof, said first switch means being responsive to both said first and second comparator means for closing the output path; and
   second switch means connected to the output of said second multiplier means for opening or closing the output path thereof, said second switch means being responsive to both said first and second comparator means for closing the output path.

* * * * *